United States Patent
McElray, Sr. et al.

(10) Patent No.: US 6,707,655 B2
(45) Date of Patent: Mar. 16, 2004

(54) ADAPTIVE PROTECTION FOR RECLOSER CONTROL

(75) Inventors: Jeffrey L. McElray, Sr., Wendell, NC (US); Carl J. LaPlace, Raleigh, NC (US); David G. Hart, Raleigh, NC (US); William M. Egolf, Apex, NC (US); Graeme N. McClure, Highett Victoria (AU)

(73) Assignee: ABB Technology AG, Zurich (CH)

( * ) Notice: Subject to any disclaimer, the term of this patent is extended or adjusted under 35 U.S.C. 154(b) by 157 days.

(21) Appl. No.: 09/749,195

(22) Filed: Dec. 27, 2000

(65) Prior Publication Data

US 2002/0080540 A1 Jun. 27, 2002

(51) Int. Cl.[7] .................................................. H02H 3/00
(52) U.S. Cl. .............................. 361/71; 361/72; 361/73
(58) Field of Search ..................................... 361/1–120

(56) References Cited

U.S. PATENT DOCUMENTS

| | | |
|---|---|---|
| 4,466,071 A | 8/1984 | Russell, Jr. ................. 364/492 |
| 5,029,039 A | 7/1991 | Yeh ............................. 361/59 |
| 5,241,444 A | 8/1993 | Yeh ............................. 361/59 |
| 5,506,789 A | 4/1996 | Russell et al. .............. 364/492 |
| 5,550,751 A | 8/1996 | Russell ....................... 364/492 |
| 5,638,296 A | 6/1997 | Johnson et al. ............. 364/492 |
| 5,659,453 A | 8/1997 | Russell et al. ................ 361/93 |
| 6,005,757 A | * 12/1999 | Shvach et al. ................ 361/64 |
| 6,347,027 B1 | * 2/2002 | Nelson et al. ................ 361/64 |

OTHER PUBLICATIONS

VR–3S Recloser 15–38kV brochure, ABB Distribution Automation Equipment Division, Raleigh, NC, Descriptive Bulletin 38–741–27 (Jun. 1999).

* cited by examiner

*Primary Examiner*—Brian Sircus
*Assistant Examiner*—Isabel Rodriguez
(74) *Attorney, Agent, or Firm*—Woodcock Washburn LLP

(57) ABSTRACT

A recloser is adaptively controlled so that it will operate in a manner responsive to prevailing conditions such as time of day, day of week, and/or load current. A protection setting group is stored in a memory accessible by the recloser controller, and contains a set of instructions for controlling the recloser based on the prevailing conditions. The prevailing conditions are continuously monitored, and the control of the recloser is based on the prevailing conditions and the protection setting group.

3 Claims, 3 Drawing Sheets

|           | 8:00am - 5:00pm | 5:01pm-7:59am |
|-----------|-----------------|---------------|
| Monday    | Fuse Clearing   | Fuse Saving   |
| Tuesday   | Fuse Clearing   | Fuse Saving   |
| Wednesday | Fuse Clearing   | Fuse Saving   |
| Thursday  | Fuse Clearing   | Fuse Saving   |
| Friday    | Fuse Clearing   | Fuse Saving   |
| Saturday  | Fuse Saving     | Fuse Saving   |
| Sunday    | Fuse Saving     | Fuse Saving   |

FIG. 2

| January   | One Phase   |
|-----------|-------------|
| February  | One Phase   |
| March     | One Phase   |
| April     | Three Phase |
| May       | Three Phase |
| June      | Three Phase |
| July      | Three Phase |
| August    | Three Phase |
| September | Three Phase |
| October   | One Phase   |
| November  | One Phase   |
| December  | One Phase   |

FIG. 3

ADAPTIVE PROTECTION FOR RECLOSER CONTROL

FIELD OF THE INVENTION

The present invention relates in general to the field of electrical power distribution systems. More particularly, the present invention relates to reclosers.

BACKGROUND OF THE INVENTION

A common problem in almost any electrical power distribution system is a momentary disruption of electrical service, such as might be caused by a momentary short circuit. For example, power lines strung between poles could swing under wind loading, momentarily touching each other or a grounded conductor. Things may fall across exposed wires, arcing could occur, or other transitory events could cause momentary power line short circuits or current surges that could burn out a fuse or trip a recloser. Most of these faults are self-correcting and do not require permanent fuse or recloser protection because they terminate quickly. If a fuse should burn out or a recloser should trip, the power line would be open and customers would be deprived of their electrical power. Service calls to replace fuses or reset reclosers would then be required, thus escalating the utility's costs.

A recloser is a fault-interrupting device used to sense current, voltage, and/or frequency and isolate faulted portions of distribution feeders. A recloser control device operates a recloser, which can be an electronic controller. Reclosers are inserted into power lines to protect a power distribution system.

More particularly, reclosers are electromechanical devices, similar to circuit breakers. Reclosers are distributed at one or more locations along a power line, typically upline from a fuse. When the recloser controller detects a fault condition, the recloser will begin to timeout. In other words, the recloser controller will initiate a trip to open the recloser if the fault condition has not cleared itself during a fixed time interval, where the time interval is a function of current. Then, after a time delay, as the name suggests, the recloser will close, and if the fault condition has been cleared, power service is restored. If, however, the fault condition has not been cleared, the recloser controller will again trip open the recloser after a second fixed time interval. If, after a predetermined number of reclose operations, the fault condition has not been cleared, the recloser controller will permanently lockout the recloser (i.e., permanently open the circuit). The circuit then remains open until the system is repaired and/or the fault condition is eliminated.

Thus, one primary function of a recloser is to save fuses. In general, this is done by sensing the peak value of the current conducted and interrupting its flow by opening or tripping a recloser before a fuse blows. After a time delay, the recloser closes, thereby restoring power to the system where it remains closed until the next fault is sensed.

The rate at which a fuse will blow and interrupt current is a function of the thermal heating of the fusible element. The rate of thermal heating is proportional to the power generated by the fault and each fuse has a time current characteristic, which describes the time interval required to interrupt the fault current. The time interval is generally approximately inversely proportional to the value of the root mean square of the fault current. It is desirable to coordinate the recloser with the fuses to be saved to insure that the recloser in fact interrupts temporary fault currents before the fuses to be protected are blown. This is generally done by approximating the root mean square value of the fault current by sensing its peak value.

It must also be recognized that not all faults, which occur on a power distribution line, are temporary, such as those caused by a tree branch momentarily falling against the line. Some faults are of a more permanent nature such as those caused by a storm where the entire pole structure has fallen to the ground. As a consequence, reclosers are built so that they will only trip a limited number of times within a short duration before locking open. Were this not done, a recloser would cycle until failure and many of the fuses to be protected would blow anyway.

At some magnitude of fault current it is desirable to have the recloser open immediately to protect the line rather than following an inverse time current characteristic. At intermediate levels it may be desirable from the power distribution standpoint to allow the fault current to flow for a limited period to allow the fault to burn itself open or blow the fuse. Many reclosers have alternate inverse time current characteristics, which achieve this goal. Typically, a recloser will allow two shots or trip operations to follow a fast time current characteristic and two additional shots along a somewhat slower time current characteristic before locking open or out.

Conventional reclosers for three-phase systems open all three phases at the same time upon detection of a fault on any one phase. Other three-phase systems implement three single-phase reclosers, one on each phase. In these systems, each single-phase recloser is independently controlled. This is costly and does not allow for the phases to be responsive to one another.

Thus, in a typical configuration, for a fault, the recloser will open to clear the fault. Note that for any fault, e.g. single-phase-to-ground faults, phase-to-phase faults, phase-to-phase-to-ground faults, and three-phase faults, a typical recloser will open all three phases. For distribution feeders, opening all three phases for a single-phase fault will result in more customers losing power than necessary. However, if an electric utility were to employ traditional single-phase recloser protection on their distribution system, it would be implemented with three independent single-phase mechanical reclosers—one for each phase. This provides a per phase approach to single-phase faults but if there is an evolving fault, such as, for example, two or more phases are faulted, then the tripping and subsequent reclosing is always done single-phase. Totally independent single-phase reclosers can also be involved in a race condition. For phase-to-phase faults, if one phase was to operate more quickly than the other does, the recloser may not correctly isolate the second faulted phase.

The recloser controller provides the intelligence that enables a recloser to sense overcurrent faults, select timing operations, time the tripping and reclosing functions, and lockout. The hydraulic unit—an integral part of the recloser is used in all single-phase reclosers and has a smaller rating of three-phase reclosers. The electronic controller is generally used in the single-phase reclosers and in higher ratings of three-phase reclosers. Such devices, however, should be appropriately programmed to coordinate in a predefined manner to endure that the power distribution systems respond to line faults in accordance with expectations.

Generally, when automatic circuit reclosers are used in conjunction with fuses, they are configured in a variety of modes. For example, the recloser or reclosing breaker may be configured for a fuse saving or fuse clearing mode. In the fuse saving mode, the automatic recloser or reclosing breaker operates faster than a fuse, trying to clear a momentary fault. If the fault is still present, the automatic circuit recloser operates more slowly than the fuse, enabling the fuse to blow and clear the fault. In the fuse-clearing mode, the automatic recloser is set so that for a fault beyond any fuse in series with the recloser, the fault shall be cleared by the fuse without causing the recloser to operate.

There are microprocessor-based recloser controllers which are capable of detecting fault conditions, and, in response, capable of timing out a corresponding recloser. However, these prior designs are not adaptive. Instead, fault detection in these prior designs is a function of some absolute (i.e., a fixed) preprogrammed current level, such that gradual changes in load current due to normal, daily and/or seasonal fluctuations are not taken into consideration. Therefore, service may be unnecessarily interrupted when the current fluctuation does not pose a threat to the system. Moreover, fault detection schemes based on an absolute current level may not always detect remote faults (i.e., faults that occur along a distal portion of a power line with respect to the position of the recloser).

It is thus desirable to provide recloser control that can overcome the problems of the prior art. In this way, an electric utility can adaptively set a recloser to function in a certain manner, such as fuse saving, fuse clearing, single-phase, or three-phase, based on prevailing conditions, such as time of day, day of week, month, or load current, for example.

SUMMARY OF THE INVENTION

The present invention is directed to recloser operation that is responsive to a particular protection setting group. Depending on the prevailing conditions, such as the time of day or the load current, the recloser functions in a certain manner, such as single-phase or in a fuse saving mode.

According to one embodiment within the scope of the present invention, a method for controlling a recloser for an electrical power line comprises determining a protection setting group, the protection setting group having at least one associated feature; determining a present condition of the at least one associated feature; determining a behavior function for the recloser based on the protection setting group and the present condition; and implementing the behavior function for the recloser, thereby controlling the recloser responsive to the behavior function.

According to aspects of the invention, the present condition is continuously monitored, and the behavior function is changed responsive to the monitoring. The monitoring can take place at predetermined times or events, such as predetermined intervals of time.

According to another embodiment within the scope of the invention, a recloser control system for an electrical power line comprises a recloser, a memory comprising a protection setting group having at least one behavior function with an associated feature, and a recloser controller coupled to the recloser and the memory for controlling the recloser responsive to one of the at least one behavior functions in the protection setting group.

The foregoing and other aspects of the present invention will become apparent from the following detailed description of the invention when considered in conjunction with the accompanying drawings.

BRIEF DESCRIPTION OF THE DRAWINGS

FIG. 2 is a simplified schematic diagram of an exemplary protection setting group in accordance with the present invention;

FIG. 3 is a simplified schematic diagram of another exemplary protection setting group in accordance with the present invention.

DESCRIPTION OF EXEMPLARY EMBODIMENTS AND BEST MODE

Figure 1:
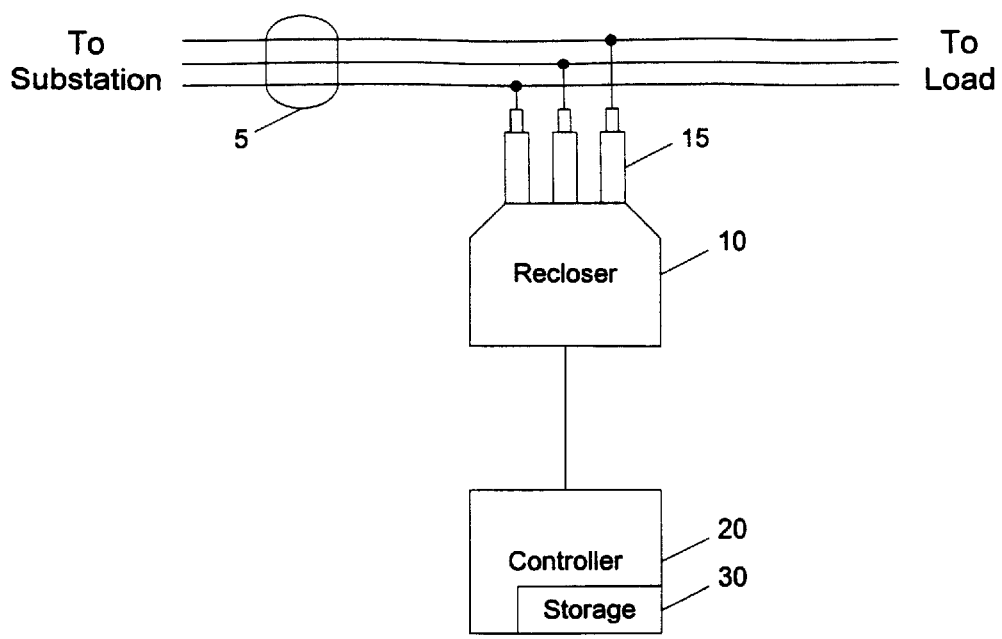
FIG. 1 is a simplified schematic diagram of a system in which the present invention may be embodied.

The present invention is directed to systems and methods for adaptively controlling a recloser so that it will operate in a manner responsive to prevailing conditions such as time or load current.

Electrical transmission lines and power generation equipment must be protected against insulation faults and consequent short circuits, which could cause a collapse of the power system, serious and expensive equipment damage, and personal injury. Further, extensive power outages may cause angst among consumers that expect reliable and trustworthy utility service. It is the function of the fault protection devices such as fuses and protective relays to assist in the isolation of line faults and initiate isolation by tripping reclosers. In addition, power distribution operators employ automatic power restoration components to automatically bring power distribution systems back on-line in the event of a protection fault or other system malfunction.

Automatic recloser devices are used in electrical distribution systems to protect high voltage power lines. Such devices are usually mounted to the poles or towers that suspend power lines above the ground. However, use with below ground systems is also known. The recloser device is used to minimize power distribution interruptions caused by transients or faults.

Typically, during a system disturbance, large increases in current, i.e., faults, will occur. Sensing a current increase, the recloser will open thereby cutting off current flow in order to protect distribution system components and other equipment connected to the distribution system. Since many fault conditions are temporary, the recloser is designed to close after a short time delay, thereby establishing normal current flow. For example, during a thunderstorm, if lightning were to strike the distribution system, the power to one's home may be disrupted for a few seconds causing lights and appliances to turn OFF (recloser opening), then ON (recloser closing). Once the recloser closes, if it senses the continued presence of increased current, (e.g. fault current rather than load current), it will again open. Such cycling between open and closed may occur three times before the recloser remains open.

When used in conjunction with other protection devices, such as a fuse or protective relay, an automatic power restoration device may operate in two modes, fuse saving or fuse clearing. In the fuse saving mode, the automatic power restoration device operates faster than a cooperating fuse, trying to clear a momentary fault. In the event the fault is still present after the restoration device's attempts to restore the system, the automatic power restoration device operates more slowly than the fuse, allowing the fuse to clear the fault. In the fuse clearing mode, the automatic power restoration device is configured so that a fault occurring beyond any fuse that is connected in series with such fault is cleared by the fuse without causing the recloser to operate.

A simplified schematic diagram of a system in which the present invention may be embodied is shown in FIG. 1. A recloser 10 is a switch that opens and closes a power line 5 (e.g., between a substation and a load), and which is operated by a recloser control device 20 such as an electronic controller. It should be understood that the term "recloser" covers various combinations of reclosers, sectionalizers, circuit breakers and the like, which may also be used within the scope of this invention. The power line 5 is a three-phase power line. The recloser 10 comprises three poles 15. Each pole 15 is connected to an associated wire on the power line 5, thereby being energized by an associated phase.

The basic components of an automatic recloser 10 are a high-speed circuit breaker, overcurrent protection, trip logic, and automatic closing logic with an operation counter. When an overcurrent of sufficient magnitude (i.e., greater than a predetermined amount of current) flows through the recloser 10, the tripping action is initiated and a circuit interrupting contact within the pole 15 opens with an operation counter advancing one count. After a preset time delay, the recloser contacts are automatically closed, thereby re-energizing the line 5. If the fault persists, this tripping and reclosing sequence is repeated a predetermined number of times, as set by the controller 20, until a lockout function is initiated. If the fault was transient and cleared during any period when the recloser 10 was open, then the recloser 20 will remain closed after a short time delay reset to its original condition ready for the next operation.

An exemplary recloser for use with the present invention is the VR-3S recloser manufactured and distributed by ABB Power T&D Company, Inc., Raleigh, N.C. Magnetic actuators open and close the recloser's main contacts.

The recloser 10 is controlled by a microprocessor-based controller 20 that contains software. There are two basic design areas that make up a microprocessor-based controller 20. The physical elements, such as integrated circuits, resistors, capacitors, displays, switches, and so forth, are called "hardware". Once constructed, they are not readily changeable. The second basic design area in the microcomputer includes computer programs and documentation. These elements are called "software" since they are readily changeable.

A microcomputer based on a microprocessor and associated memories and interfacing components is used in the recloser controller 20 to process input signals in a manner appropriate for recloser control. The microprocessor performs the various arithmetic and logic functions of the control. In particular, the required logic circuits as well as capabilities for servicing are typically included.

A power supply is typically provided in a recloser control system and provides power to other components of the control system and includes power storage means to supply power when the protected lines are interrupted. A secondary overcurrent trip circuit in the control functions independently of the microcomputer when the microcomputer is disabled to effect a trip operation of the recloser. A protective input network protects the controllers low power devices from the hostile environment of the power distribution system and scaling means are used to allow the microcomputer and associated circuitry to function with more precision in the range of input signal magnitudes where precision is desirable and to allow the control to function with a limited number of components over a wide range of input signals.

Storage or memory 30 is provided for temporarily and/or permanently storing data. In a recloser 10, for example, this data would include line current magnitudes and command information such as multiple time-current characteristic curves and protection setting groups, as further described below. The memory can be random access memory (RAM) or read only memory (ROM) or any other type of memory. ROM is preferably electrically programmable for easy modification and is used for storing programming information. The storage 30 can be internal to the controller 20, as shown, or be located external to the controller 20.

The front panel of a recloser controller 20 may include a display for displaying information. A keyboard or other input device may be used for entering information. Indicator lamps provide status information such as recloser open, recloser closed, control lock out, above minimum trip, malfunction and lock in.

Through the use of the switches and keyboard mentioned above, the operations of the device can be controlled by command information. Typical command information for a recloser controller includes first time current characteristics for phase and ground currents which usually result in the more rapid tripping of the recloser 10, and second time current characteristics for phase and ground currents which usually result in the recloser 10 remaining closed longer under fault conditions. Other command information includes minimum trip levels for phase and ground currents which in a recloser controller begins the timing process in accordance with the time current characteristic, number of shots to lock out under phase and ground faults, and number of times which a given time current characteristic will be followed. Further command information may include a reset time interval which determines the duration which a counter recording the shot number will retain that information under non-fault conditions, and multiple reclose intervals which determine the time that the recloser 10 will remain open. Additional command information may include a high current constant time feature which allows the recloser 10 to remain closed only for a fixed duration under certain magnitudes of fault currents. Thus, if there is a fault, the line 5 is opened for a short period of time. At an end of a given time period following the opening of the line 5, the recloser 10 closes the line 5. If the abnormal condition persists, the recloser 10 again opens and closes the line 5.

The command information in accordance with the present invention can include a plurality of independent protection settings groups. The protection setting group can be programmed by a technician or by the customer, either when the system is on-line or off-line. A protection setting group is an instruction set for controlling a recloser based on certain conditions. An exemplary protection setting group is shown in FIG. 2. Here, the protection setting group is based on time of day and day of week. A fuse-clearing mode is enabled for a particular time and day (e.g., during business hours, Monday through Friday) and a fuse saving mode is enabled for the remaining times (e.g., during weekends and after business hours). In this manner, the quality of supply is optimized for a majority of customers during business hours, Monday through Friday, and operating expenditures are minimized when the quality of the supply is not as critical (during weekends and after business hours).

Another exemplary protection setting group is shown in FIG. 3. Here, the recloser is set to operate in one phase (single-phase) mode or three-phase mode depending on the month of the year. Single-phase operation is implemented from October through March, and three-phase operation is implemented from April through September. In this manner, for example, in a rural area, irrigation may take place for several months of the year, in which three-phase protection is desired to adequately protect pump motors. During the remaining months, it is desirable to have one phase protection because active loads are single-phase in nature and it is desirable to minimize the effects of outages due to faults. Thus, a clock and calendar can be used to control the operation of the recloser as single-phase or three-phase operation, and/or fuse clearing mode or fuse saving mode.

Another exemplary protection setting group can be based on the load current. Based on the load current, different features are enabled, such as fuse saving or fuse clearing protection, and single-phase or three-phase operation. In this manner, protection can be established to behave differently to a given fault based on which protection setting group is active, based on the prevailing conditions.

It should be understood any of a number of microprocessors could be used to the same effect described above. Each manufacturer's family requires that the peculiarities of their devices be satisfied and in the microcomputer portion of the recloser controller 20, and it would be impossible to go into sufficient detail to describe the functioning control and be sufficiently general to adequately describe the use of alternative devices. One skilled in the art could readily amplify and modify the description given to make them applicable to the devices of other manufacturers by reading the normal technical literature provided by the manufacturer of another device. Moreover, it would be extremely confusing to attempt to describe all the minor details contained within the software and only the more general software modules and programs are described since one skilled in the art could readily flesh out the skeleton provided.

An exemplary control unit is the PCD2000 power control device manufactured and distributed by ABB Power T&D Company, Inc., Raleigh, N.C. The control device can provide an interface for remote communication with SCADA systems using MODBUS RTU, MODBUS ASCII, and DNP 3.0 protocols. The controller can be programmed to implement other protocols. Ports are available for external links through a radio, modem, or direct fiber optic communications, for example.

Figure 4:
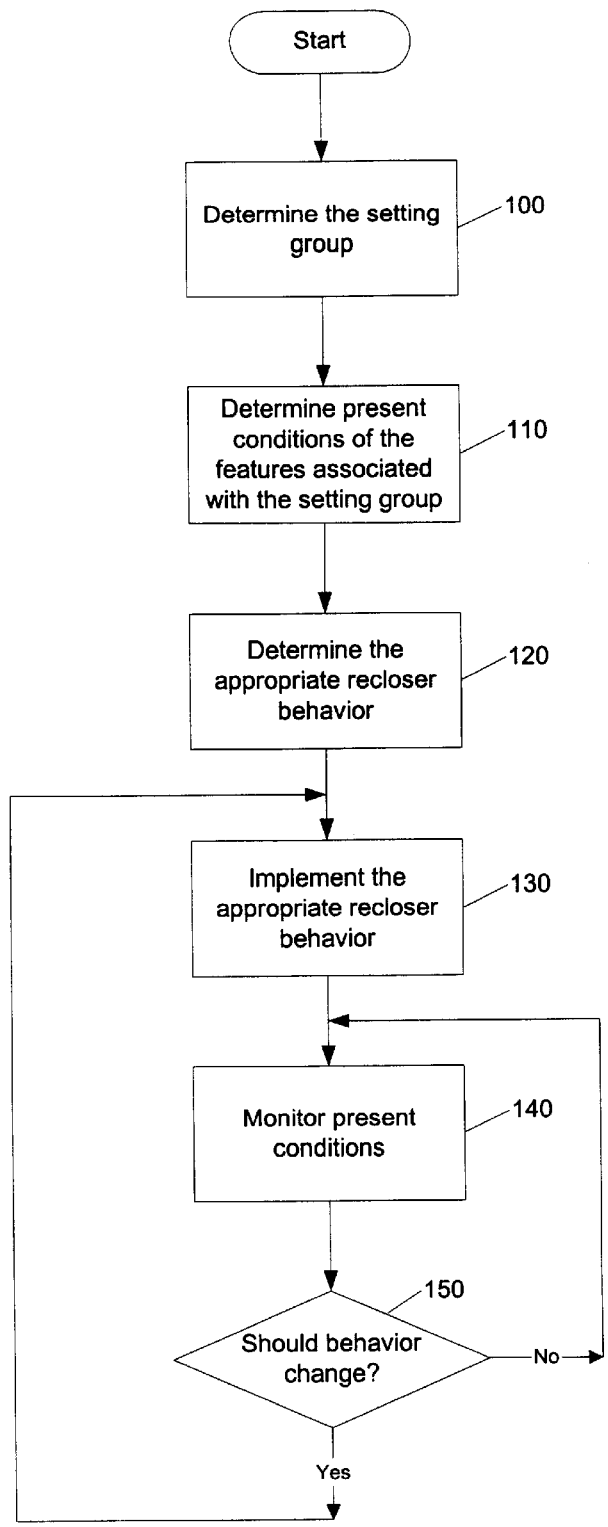
FIG. 4 is a flow chart of an exemplary method of operation in accordance with the present invention.

FIG. 4 is a flow chart of an exemplary method of operation in accordance with the present invention. During power delivery, the recloser 10 monitors the power line 5. At step 100, the setting group is determined, selected, or otherwise set. The setting group can be retrieved from a storage area 30 (e.g., a memory within, or coupled to, the recloser controller 20). A plurality of setting groups (related or unrelated) can be stored in the storage area 30, and a technician or customer can choose the desired setting group while the system is on-line or off-line.

After the setting group has been determined, the present or prevailing conditions of the features associated with the setting group are determined at step 110. For example, if the setting group of FIG. 2 is active, the time of day and day of the week would be determined, because the fuse clearing or fuse saving mode is set dependent on these two parameters. As another example, if the setting group of FIG. 3 is active, the month of the year is determined, because single-phase or three-phase operation is set responsive to the month of the year.

At step 120, the appropriate recloser behavior is determined from the protection setting group based on the prevailing conditions. This is performed by comparing the prevailing conditions step 110 to the conditional entries in the protection setting group step 100, and the entry that matches is implemented, at step 130. Thus, for example, if the setting group of FIG. 2 is active, and it is 1:00 pm on a Wednesday, then based on the protection setting group entries, the fuse clearing mode is implemented.

The present or prevailing conditions are continuously monitored, at step 140, to determine if the recloser behavior should be changed, as determined at step 150. If the behavior should change, the new behavior is determined and implemented with processing continuing at step 130. If the behavior should not change, the conditions are monitored, with processing continuing at step 140. The prevailing conditions are monitored at predetermined intervals (of time, for example) or at other events, which can be programmed by a technician or customer.

Thus, for example, if the setting group of FIG. 2 is active, when the time changes from 5:00 pm to 5:01 pm, on a Wednesday, the mode changes from fuse clearing to fuse saving. The fuse saving mode is implemented until 8:00 am on Thursday, at which time the mode changes to fuse clearing.

The invention may be embodied in the form of appropriate computer software or in the form of appropriate hardware or a combination of appropriate hardware and software without departing from the spirit and scope of the present invention. Further details regarding such hardware and/or software should be apparent to the relevant general public. Accordingly, further descriptions of such hardware and/or software herein are not believed to be necessary.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed is:

1. A method for controlling a recloser for an electrical power line, comprising:

determining a protection setting group, the protection setting group having at least one associated feature;

determining a present condition of the at least one associated feature;

determining a behavior function for the recloser based on the protection setting group and the present condition, wherein the behavior function comprises one of single-phase operation and three-phase operation; and adaptively setting the recloser to function in accordance with the behavior function.

2. A recloser control system for an electrical power line, comprising:

a recloser;

a memory comprising a protection, setting group having at least one behavior function with an associated feature, wherein the at least one behavior function comprises one of single-phase operation and three-phase operation; and a recloser controller coupled to the recloser and the memory for adaptively setting the recloser to function in accordance with one of the at least one behavior functions in the protection setting group.

3. A computer-readable medium having computer-executable instructions for performing steps comprising:

determining a protection setting group for a recloser operating on an electrical power line, the protection setting group having at least one associated feature;

determining a present condition of the at least one associated feature;

determining a behavior function for the recloser based on the protection setting group and the present condition, wherein the behavior function comprises one of single-phase operation and three-phase operation; and adaptively setting the recloser to function in accordance with the behavior function.

* * * * *